United States Patent [19]
Rich et al.

[11] Patent Number: 5,758,271
[45] Date of Patent: May 26, 1998

[54] APPARATUS AND METHOD FOR OPTIMIZING THE QUALITY OF A RECEIVED SIGNAL IN A RADIO RECEIVER

[75] Inventors: Randall W. Rich, Lake Villa; Richard J. Vilmur, Palatine, both of Ill.

[73] Assignee: Motorola, Inc., Schaumburg, Ill.

[21] Appl. No.: 978,099

[22] Filed: Nov. 25, 1997

Related U.S. Application Data

[63] Continuation of Ser. No. 458,533, Jun. 2, 1995, abandoned.

[51] Int. Cl.$^6$ .............................. H04B 1/06; H04B 7/00
[52] U.S. Cl. .................... 455/234.1; 455/226.2; 455/67.3
[58] Field of Search .............................. 455/226.1, 226.2, 455/226.3, 63, 67.1, 67.3, 234.1, 240.1, 245.1, 234.2, 296, 295, 246.1, 247.1

[56] References Cited

U.S. PATENT DOCUMENTS

| | | |
|---|---|---|
| 5,001,776 | 3/1991 | Clark ........................ 455/234.1 |
| 5,119,508 | 6/1992 | Shamasundara ............ 455/234.1 |
| 5,321,847 | 6/1994 | Johnson, Jr. ................ 455/63 |
| 5,390,345 | 2/1995 | Wada et al. ................ 455/234.1 |
| 5,408,698 | 4/1995 | Serizawa et al. ........... 455/240.1 |
| 5,448,774 | 9/1995 | Yokozaki et al. ........... 455/234.1 |
| 5,469,115 | 11/1995 | Peterzell et al. ............ 455/240.1 |

*Primary Examiner*—Reinhard J. Eisenzopf
*Assistant Examiner*—Marsha D. Banks-Harold
*Attorney, Agent, or Firm*—Kevin D. Kaschke

[57] ABSTRACT

A code division multiple access (CDMA) radio receiver (104) having gain receives a radio frequency (RF) signal (122) to produce a received signal (124). The quality (130) of the received signal (124) is determined (111). The quality (130) is preferably a ratio of an energy per chip of a desired signal (Ec) to a total power spectral density of the received signal (Io) (124). For alternative radio receivers (104) the quality (130) may be an error rate estimate of a demodulated signal (126). The gain of the radio receiver (104) is adjusted responsive to the quality (130) of the received signal (124) to optimize the quality (130) of the received signal (124). Further, since the adjusted gain also changes a received signal strength indication (RSSI) (242) of the received signal (124), the RSSI (242) of the received signal (124) is estimated (217) and compensated (218) responsive to the gain of the radio receiver (104) to produce a compensated RSSI (134) of the received signal (124) indicative of the RSSI of a desired RF signal (122).

116 Claims, 4 Drawing Sheets ated 5,758,271

APPARATUS AND METHOD FOR OPTIMIZING THE QUALITY OF A RECEIVED SIGNAL IN A RADIO RECEIVER

This is a continuation of application Ser. No. 08/458,533 filed Jun. 2, 1995 and now abandoned.

FIELD OF THE INVENTION

The present invention relates generally to radio frequency (RF) receivers, and more particularly to an apparatus and method for optimizing the quality of a received signal in a radio receiver.

BACKGROUND OF THE INVENTION

A radio transceiver, of which a cellular radiotelephone mobile subscriber unit is a convenient example, provides an appropriate setting for describing the need for the present invention. Radio subscriber units are typically designed to operate with dual cellular systems (for example: system A or B) that provide competing services in a particular geographical area. Each system is assigned a number of channels with a particular channel spacing and each channel has a particular center frequency as called out, for example, in Electronic Industries Association TIA/EIA/IS-95 "Mobile Station— Land Station Compatibility Standard For Dual-Mode Wideband Spread Spectrum Cellular System, published July 1993 (herein referred to as "IS-95 Standard").

Economical subscriber units are designed to operate on either of the A or B systems. Therefore, the subscriber unit receiver simultaneously receives all RF signals in the cellular receive band present at any given time and location. This includes both A and B system signals. The receiver then down converts these RF signals such that the desired signal is centered within the passband of an intermediate frequency (IF) filter which passes the desired signal and attenuates the undesired signals. Unfortunately, the IF filter does not provide infinite attenuation to the undesired signals so some pass through the IF filter at a reduced level. In addition, the undesired signals interact with each other within the receiver through a process known as intermodulation to produce new interfering signals at the same frequency as the desired signal. Intermodulation will be explained more thoroughly hereinbelow. This problem becomes worse as the ratio of the level of undesired RF signals to the level of the desired RF signal increases. The A and B system designers attempt to minimize the occurrence of this problem through system design, however, it is difficult, if not impossible, to totally eliminate the problem.

One situation which is particularly difficult to overcome is now described. A mobile subscriber is operating on an A channel, i.e. the mobile is receiving a desired RF signal from an A system base station on an A system channel. As the mobile travels away from the A base station, the desired RF signal level decreases. At the same time, the mobile may be traveling towards a B system base station which is transmitting a multitude of RF signals on B system channels. These signals are undesired RF signals for the mobile operating on the A system. As the mobile approaches the B system base station, the level of the undesired RF signals increases. Thus, the undesirable situation occurs where the desired RF signal level is decreasing and the undesired RF signals are increasing. If the ratio of the level of undesired R-F signals to the level of the desired RF signals becomes too high, the mobile user will experience degraded call quality and possibly lose service.

A typical scenario exemplifying the problem is described with reference to a code division multiple access (CDMA) mobile station operating in a CDMA radio system which is a digital system and in an advanced mobile telephone system (AMPS) which is an analog radio system. The mobile station communicates with a desired base station in an active call. The radio receiver of the mobile station detects a reduction in the ratio of Ec/Io which may be caused by the presence of strong undesired signals. Ec is an energy per chip of the desired signal and Io is a total power spectral density of the received signal. A radio receiver of the mobile station reports the reduction in the ratio of Ec/Io to the base station it is communicating with. The base station then increases the energy per chip of the desired signal (Ec) to improve the desired signal strength at the radio receiver. However, increasing the energy per chip of the desired signal (Ec) reduces overall capacity of the radio system. Further, the energy per chip of the desired signal (Ec) can only be increased to a limit. At the limited energy per chip of the desired signal (Ec) the undesired signals may still overcome the desired signal. This is the case when the mobile station is very close to the base station transmitting the undesired signals and far away from or shielded from the base station transmitting the desired signal. Thus, the ratio of Ec/Io keeps decreasing. The mobile station's frame error rate (FER) of the received signal increases as the ratio of Ec/Io decreases, and eventually, the active call is dropped.

A particular undesired signal response produced by receivers is commonly referred to as intermodulation distortion (IM). IM distortion develops in the presence of two or more interfering signals so separated from the assigned input signal frequency and from each other such that the Nth order mixing of the two or more interfering signals that occurs in the nonlinear electronic devices in the receiver produces a third signal referred to as an IM distortion product whose frequency is equal to that of the assigned input signal frequency. The transfer functions of electronic devices commonly used in amplifying and mixing circuits within receivers are seldom if ever perfectly linear. The non-ideal characteristics inherent in these devices lead to IM distortion.

For example, one well known form of IM distortion is 3rd order IM distortion. A 1 dB change in signal strength of the interfering signals results in a 3 dB change in signal strength of the undesired third order IM distortion product. Those wishing to understand the background for this 3:1 relationship may reference a paper presented by Richard C. Sagers of Motorola Inc. entitled "Intercept Point and Undesired Responses", presented before the 32nd IEEE Vehicular Technology Conference May 23–25, 1982. This 3:1 relationship is commonly used in designing receivers to maximize the rejection of 3rd order IM distortion.

It is also well known that increasing the bias current of the electronic devices in the receiver generally helps to reduce IM distortion. However, portable radio subscriber units get their power from portable power sources. Portable radio subscriber units are typically designed to minimize power consumption in order to get maximum use in either a low current—standby mode when the portable radio is waiting for an incoming call or a high current—active use mode when the portable radio is transceiving speech or data. Therefore, increasing the current drain in the receiver to reduce IM distortion is not desirable because the increased current drain reduces the amount of time that the portable radio can be used.

It is also well known that system planning also helps reduce IM distortion. System planning includes such solutions as colocating base stations, and using directional antennas in the base stations. The distance between a base station and a radio receiver is a significant factor in the signal level of the received signal in the radio receiver. Therefore, colocating an undesired base station, transmitting an undesired signal that produces IM distortion, near a desired base station, transmitting a desired signal, significantly reduces the likelihood that the IM distortion will overpower the desired signal. However, colocating base stations of different systems is not always possible due to factors such as the physical location of the base stations, the time lapse between installation of the base stations and the ownership of the base stations, for example.

Base stations having directional antennas helps reduce IM distortion because a signal transmitted by a directional antenna has increased power in the aimed direction over a unidirectional antenna. The increased signal power increases the likelihood that the desired signal will not be overcome by the IM distortion. However, the reduction in IM interference depends on the relative distances between the radio receiver and the desirable base station having the directional antenna and the undesirable base station causing the IM distortion. Therefore, it is possible that when the radio receiver is very close to an undesirable base station and far from the desired base station no amount of directionality of the antenna from the desired base station will overcome the IM distortion. Further, directional antennas sacrifice signal coverage in other directions which limit radio coverage of the system and increase the need for more base stations to improve the radio coverage.

Mobile radios such as cellular telephones are required to operate over channels with dynamically changing conditions including thermal noise and interference. The thermal noise is set by the receiver noise figure, receiver bandwidth, and temperature. Thermal noise changes relatively slowly under most conditions. Interference, on the other hand, is generated by a multitude of sources and mechanisms, and may change at a relatively fast rate. Sources of interference include co-channel interference, adjacent channel desense, and intermodulation (IM).

Receiver designers typically refer to the stages in the receiver lineup closest to the antenna as the receiver front end and the stages furthest from the antenna as the receiver back end. Traditionally, the receiver front end gain is set sufficiently high to overtake the worst case receiver back end noise figure to achieve acceptable sensitivity.

Typically, a low noise amplifier (LNA) having fixed gain is the first active stage in the receiver lineup. The gain of the LNA is set high for minimum receiver noise figure resulting in acceptable receiver sensitivity. The penalty for high LNA gain, however, is linearity. As the LNA gain increases, the stages following the LNA such as the down mixer must be made more linear to maintain the same IM performance. Unfortunately, higher linearity typically requires higher DC power dissipation which is obviously undesirable for battery-operated radios. Conversely, if the LNA gain is lowered to improve IM performance, the receiver sensitivity degrades. Therefore, a tradeoff must be made between sensitivity, IM rejection, and receiver DC power dissipation in conventional radios.

Achieving an acceptable tradeoff between sensitivity, IM rejection, and DC power dissipation is especially challenging for CDMA radios compared to AMPS cellular radios for the following reasons. Firstly, the CDMA channel is 40 times wider than the AMPS channel resulting in a higher probability of occurrence of on-channel IM generated products. Secondly, the CDMA IF filter loss is 10 to 12 dB higher than the AMPS IF filter loss. Therefore, more front end gain is required to overtake the back end noise figure for equivalent sensitivity. These two characteristics of conventional CDMA radios typically tend to increase the receiver front end DC power dissipation up by a factor of 5 to 6 compared to an AMPS radio to maintain adequate linearity and IM rejection.

In order to reduce receiver power dissipation while reducing the level of interference, a radio receiver which dynamically increases its linearity characteristics when interference is present is desired. Accordingly, there is a need for an apparatus and method for optimizing the quality of a received signal in the radio receiver.

DETAILED DESCRIPTION OF A PREFERRED EMBODIMENT

Figure 1:
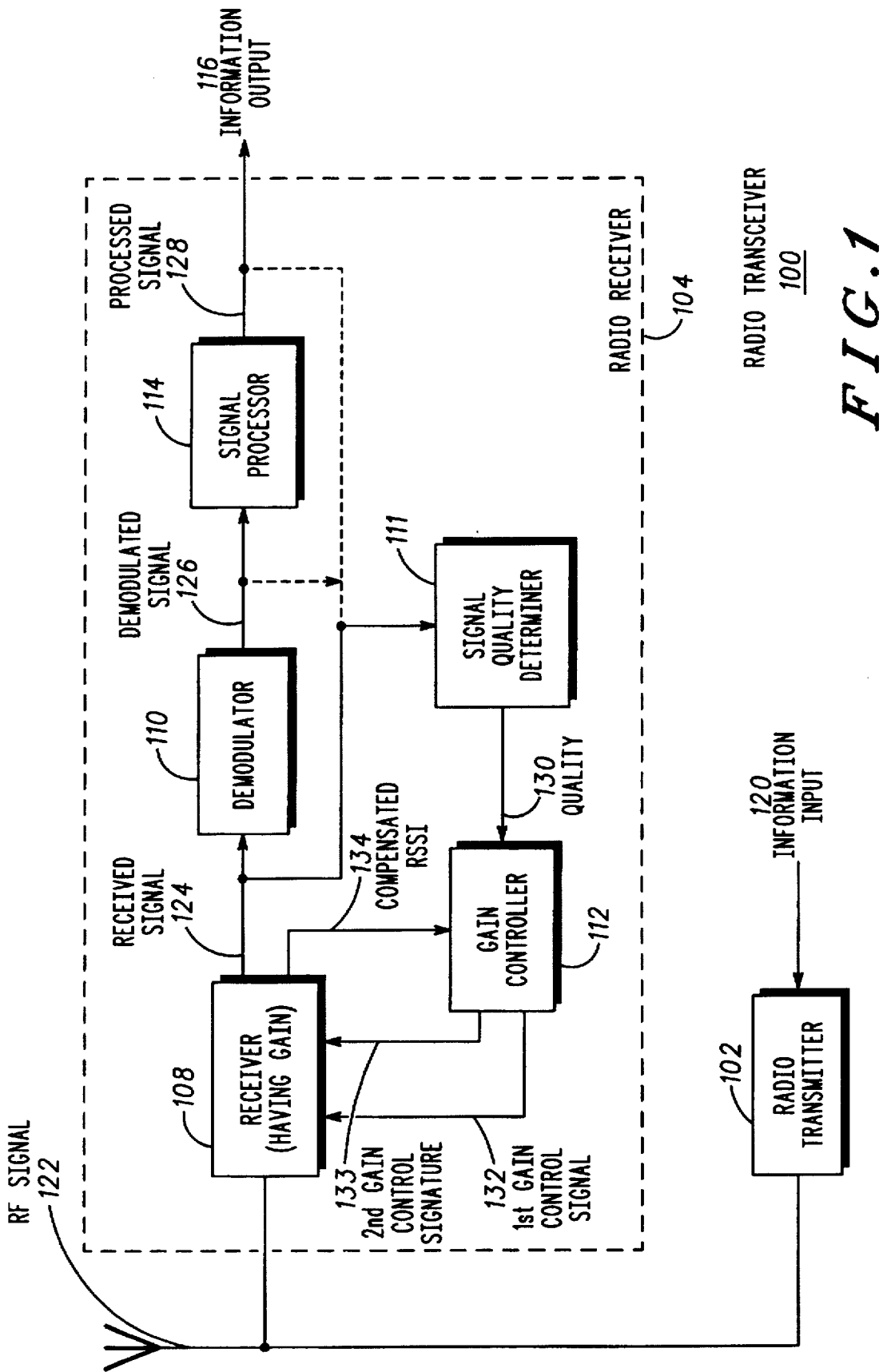
FIG. 1 illustrates a general block diagram of a radio transceiver in accordance with the present invention.

The present invention can be more fully described with reference to FIGS. 1–4, wherein FIG. 1 illustrates a general block diagram of a radio transceiver 100 in accordance with the present invention. The radio transceiver 100 generally includes a radio transmitter 102, a radio receiver 104 and an antenna 106. The radio transmitter 102 transmits information via the antenna 106 and the radio receiver 104 receives information via the antenna 106.

In the preferred embodiment of the present invention, radio transceiver 100 is a cellular radiotelephone subscriber unit. The radio transceiver 100 may take many forms that are well known in the art, such as a vehicular mounted unit, a portable unit, or a transportable unit. According to the preferred embodiment of the present invention, the mobile station is a CDMA mobile station designed to be compatible with the CDMA cellular radiotelephone system as described in the aforementioned IS-95 Standard.

Generally, the radio transmitter 102 and the antenna 106 are individually well known in the art, and hence no additional description need be provided here except as may be necessary to facilitate the understanding of the present invention. The radio transmitter 102 is generally taught in Motorola radiotelephone model number SUF1712 herein incorporated by reference. The radio transmitter 102 receives information at an information input 120. The information is generally either voice or data.

The radio receiver 104 is considered to be novel and will be described in general with reference to FIG. 1 and in further detail with reference to the following FIGS. 2–4. The radio receiver 104 generally includes a receiver having gain 108, a demodulator 110, a signal quality determiner 111, a gain controller 112, a signal processor 114. The radio receiver 102 generates information at an information output 116. The information is generally either voice or data. Generally, the receiver having gain 108, the demodulator 110, the signal quality determiner 111 and the signal processor 114 are individually well known in the art, and hence no additional description need be provided here except as may be necessary to facilitate the understanding of the present invention. The receiver having gain 108 is generally taught in Motorola radiotelephone model #SUF1712 and U.S. Pat. No. 5,321,847 herein incorporated by reference. The demodulator 110 and the signal quality determiner 111 are generally embodied within an application specific integrated circuit (ASIC) as described in "CDMA Mobile Station Modem ASIC", *Proceedings of the IEEE* 1992 *Custom Integrated Circuits Conference*, section 10.2, pages 1–5; and taught in a paper entitled "The CDMA Digital Cellular System an ASIC Overview", *Proceedings of the IEEE* 1992 *Custom Integrated Circuits Conference*, section 10.1, pages 1–7 (herein incorporated by reference). The signal processor 114 is generally includes, for example, a channel decoder, error detection/correction, audio processor, data processor which are well known to those skilled in the art.

Generally, the radio receiver 104 of the present invention receives desired RF signals modulated by a first modulation method but also sometimes receives interfering RF signals modulated by a second modulation method. Two such methods for modulating RF signals include analog modulation and digital modulation. RF signals modulated using analog modulation techniques are referred to as analog RF signals. RF signals modulated using digital modulation techniques are referred to as digital RF signals. Radio transceivers that can receive and transmit either analog radio frequency (RF) signals or digital RF signals are known as dual mode radio transceivers. In the preferred embodiment of the present invention, the radio receiver 104 can receive either analog RF signals or code division multiple access (CDMA) RF signals. Dual mode radio receivers that can receive either analog or CDMA RF signals are well known in the art and are generally taught in the aforementioned IS-95 Standard. Alternatively, the present invention can be used with time division multiple access (TDMA) radio receivers and Group Special Mobile (GSM) radio receivers. Dual mode radio receivers that can receive either analog or TDMA RF signals are well known in the art and are generally taught in a Motorola radiotelephone model number SUF1702C herein incorporated by reference Radio receivers that can receive GSM RF signals are well known in the art and are generally taught in Motorola radiotelephone model number SUF1702C herein incorporated by reference.

The gain controller 112 in combination with the receiver having gain 108, demodulator 110, the signal quality determiner 111 and the signal processor 114 forms a novel apparatus and method therefor and will be described in general with reference to FIG. 1 and in further detail with reference to the following FIGS. 2–4. Generally, the apparatus and method therefor in the radio receiver 104 optimizes a quality 130 of a received signal 124 in the radio receiver 104 having gain. The present invention is useful with any radio receiver that can determine the quality of the received signal 124. In particular, the receiver having gain 108 receives a radio frequency (RF) signal 122 to produce the received signal 124. The signal quality determiner 111 determines the quality 130 of the received signal 124. The gain controller 112 adjusts the gain of the radio receiver 104 responsive to the quality 130 of the received signal 124.

Further, the signal processor 114 processes the demodulated signal 126 to produce a processed signal 128, at the information output 116.

In the preferred embodiment of the present invention, the gain controller 112 is implemented in software.

Alternatively, the gain controller 112 can be implemented with discrete parts or in an integrated circuit.

The gain controller 112 can be designed to adjust the gain of the radio receiver 104 at any rate suitable for the radio receiver 104. Further, the gain controller 112 can be designed to adjust the gain of the radio receiver 104 either incrementally or continuously depending on whether its implementation is digital or analog, respectively. Preferably, the gain controller 112 is operational when the quality 130 of the received signal drops below a predetermined threshold. Alternatively, the gain controller 112 may be operational when the radio receiver 104 is in service.

In the preferred embodiment of the present invention, the RF signal 122 has a receive frequency range of 869 MHz to 894 MHz.

The received signal 124 includes a desired signal and an undesired signal. The undesired signal may include, for example noise generated within the receiver and distortion products generated within the receiver including IM distortion products. In the preferred embodiment of the present invention, the quality 130 of the received signal 124 comprises a ratio indicative of the desired signal to the received signal 124. Preferably, in a CDMA system, the ratio comprises an energy per chip of the desired signal (Ec) to a total power spectral density of the received signal (Io).

The quality 130 of the received signal 124 may be derived from various signal points in the radio receiver 104. Alternatively, the signal quality determininer III can comprise an error rate estimator for estimating an error rate of the demodulated signal 126 or of the processed signal 128 (shown as hatched lines into the signal quality determiner 111). The error rate derived from the demodulated signal 126 is a symbol error rate. The gain controller 112 adjusts the gain of the radio receiver 104 responsive to the symbol error rate of the demodulated signal 126. The error rate derived from the processed signal 128 is a bit error rate. The gain controller 112 adjusts the gain of the radio receiver 104 responsive to the bit error rate of the processed signal 128. All of these signal points for deriving the quality 130 of the received signal 124 produce substantially the same type of information for the gain controller 112. The particular signal point for deriving the quality 130 of the received signal 124 will depend upon the modulation method, the radio receiver topology, and other well known design considerations.

Figure 2:
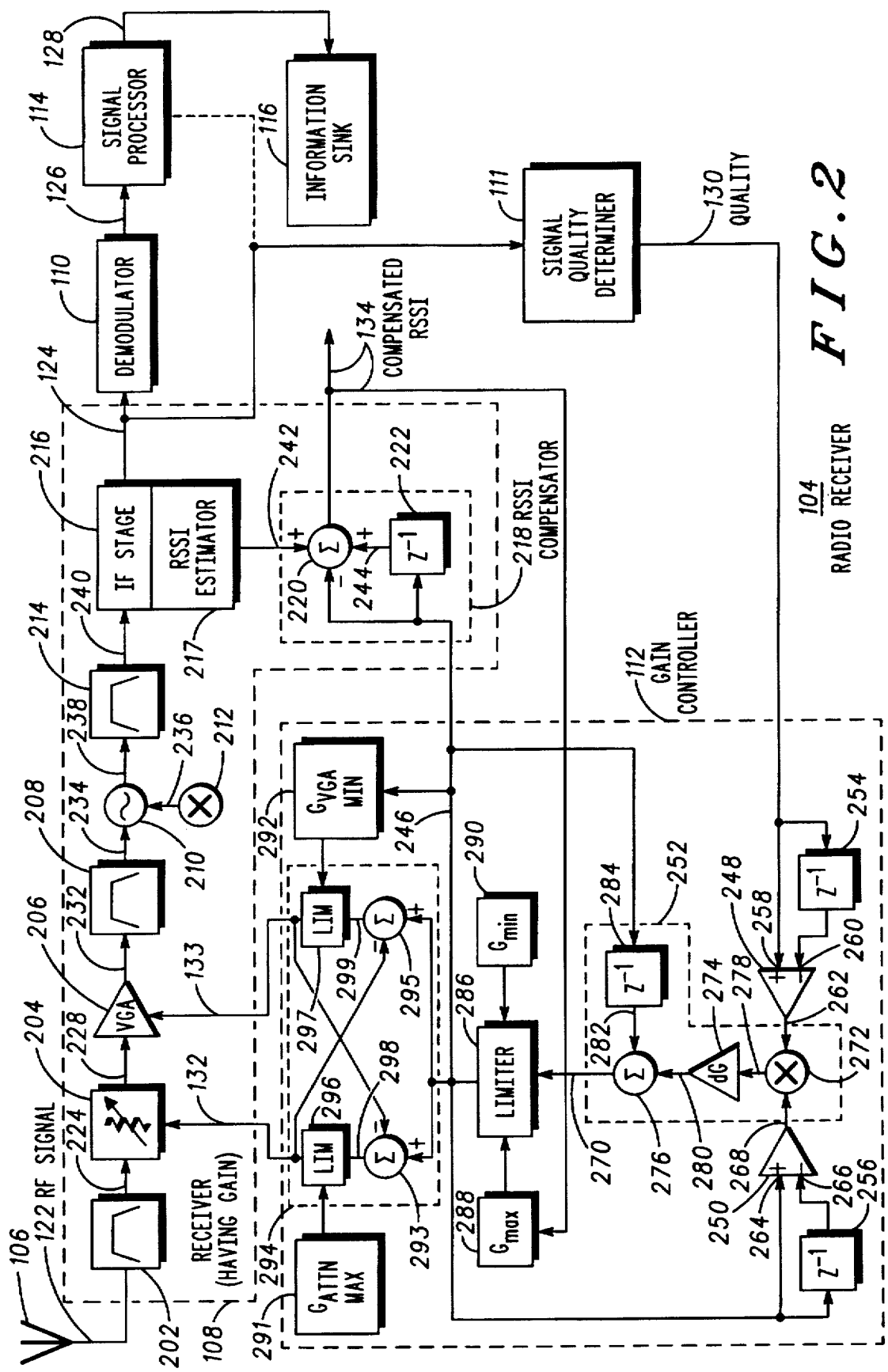
FIG. 2 illustrates detailed block diagram a radio receiver in the radio transceiver of FIG. 1 in accordance with the present invention.

FIG. 2 illustrates a detailed block diagram of the radio receiver 104 of FIG. 1 in accordance with the present invention. Generally, FIG. 2 illustrates further detail of the receiver 108 and the gain controller 112. The receiver 108 generally includes a first bandpass filter 202, a variable attenuator 204, a variable gain amplifier 206, a second bandpass filter 208, a mixer 210, a local oscillator 212, a third bandpass filter 214, an intermediate frequency (IF) stage 216, a received signal strength indication (RSSI) estimator 217, and a RSSI compensator 218. The RSSI compensator 218 further includes a summer 220 and a delay element 222. Generally, the first bandpass filter 202, the variable attenuator 204, the variable gain amplifier 206, the second bandpass filter 208, the mixer 210, the local oscillator 212, the third bandpass filter 214, the intermediate frequency (IF) stage 216, the RSSI estimator 217, the summer 220 and the delay element 222 are individually well known in the art, and hence no additional description need be provided here except as may be necessary to facilitate the understanding of the present invention.

The first bandpass filter 202 filters the RF signal 122 to produce a first filtered signal 224. The variable attenuator 204 attenuates the first filtered signal responsive to a first gain control signal 132 from the gain controller 112 to produce an attenuated signal 228. The variable gain amplifier 206 amplifies the attenuated signal 228 responsive to a second gain control signal 133 from the gain controller 112 to produce an amplified signal 232. The term "amplifies" here generally refers to changing the level of the attenuated signal 228 including both increasing and decreasing the level of the attenuated signal 228. Alternatively, the variable gain amplifier 206 may be implemented with a fixed gain amplifier followed by a variable gain attenuator (both not shown) as is well known in the art. Alternatively, the gain control signal from the gain controller 112 may cause the gain of other known elements in the radio receiver 104 to vary. The second bandpass filter 208 filters the amplified signal 232 to produce a second filtered signal 234. The mixer 210 mixes the second filtered signal 234 responsive to a local oscillator signal 236 provided by the local oscillator 212 to produce an IF signal 238. The third bandpass filter 214 filters the IF signal 238 to produce a filtered IF signal 240. The intermediate frequency (IF) stage 216 receives the filtered IF signal 240 and is operative to produce the received signal 124. The RSSI estimator 217 estimates the RSSI of the filtered IF signal 240. The receiver line up including 202, 204, 206, 208, 210, 212, 214, 216 and 217 from the first bandpass filter 202 to the IF stage 216 is conventional and will not be discussed in further detail.

The RF signal 122 includes a desired RF signal and an undesired RF signal. The undesired RF signal includes one or more RF signals centered at various RF frequencies. The radio receiver 104 needs a RSSI estimate of the desired RF signal for a variety of reasons well known to those skilled in the art of radio receiver design. The RSSI estimate of the desired RF signal provided by the RSSI estimator is a function of the total gain ahead of the RSSI estimator. Therefore, when the gain of the variable gain amplifier 206 changes, the RSSI estimate 242 it is no longer a good indication of the RSSI of the desired RF signal. The RSSI estimate of the desired RF signal provided by the RSSI estimator is a function of the total gain ahead of the RSSI estimator. Therefore, in the preferred embodiment of the present invention, the RSSI compensator 218 compensates the RSSI estimate 242 responsive to the gain of the radio receiver 104 to produce a compensated RSSI 134 of the received signal 124 indicative of the RSSI of the desired RF signal 122. The RSSI compensator 218 is implemented with a summer 220 and a delay element 222. The summer 220 sums the RSSI of the received signal 242 with a delayed gain signal 244 and subtracts a limited gain control signal 246 to produce the compensated RSSI 134 of the received signal 124. Thus, the amount of gain imposed on the received signal 124 is removed or undone in order to obtain a proper estimate of the RSSI of the received signal 242.

The gain controller 112 generates the limited gain control signal 246 responsive to the quality 130 of the received signal 124 and adjusts the gain of the radio receiver 104 responsive to the limited gain control signal 246.

In the preferred embodiment of the present invention, the gain controller 112 comprises a first comparator 248, a second comparator 250, a gain control signal determiner 252, a first delay element 254 and a second delay element 256. Generally, the first comparator 248, the second comparator 250, the gain control signal determiner 252, the first delay element 254 and the second delay element 256 are individually well known in the art, and hence no additional description need be provided here except as may be necessary to facilitate the understanding of the present invention.

The first comparator 248 compares a present measurement of the quality 130 of the received signal 124 at a positive input 258 to the first comparator 248 with a past measurement of the quality 130 of the received signal 124 at a negative input 260 to the first comparator 248 to produce a first output signal 262 which assumes a value of +1 or −1. The second comparator 250 compares a present measurement of the gain 246 at a positive input 264 to the second comparator 250 with a past measurement of the gain 246 at a negative input 266 to the second comparator 250 to produce a second output signal 268 which assumes a value of +1 or −1. The gain control signal determiner 252 determines the gain control signal 270 responsive to the first 262 and second 268 output signals.

In the preferred embodiment of the present invention, the gain control signal determiner 252 comprises a first multiplier 272, a second multiplier 274, a summer 276 and a delay element 284. Generally, the first multiplier 272, the second multiplier 274, the summer 276 and the delay element 284 are individually well known in the art, and hence no additional description need be provided here except as may be necessary to facilitate the understanding of the present invention. The first multiplier 272 multiplies the first output signal 262 and the second output signal 268 to produce a multiplied signal 278. The second multiplier 274 multiplies the multiplied signal 278 by a predetermined gain control step value (dG) to produce a gain control step signal 280. The summer 276 sums the gain control step signal 280 with a past gain control signal 282 provided by delay element 284 to produce a present gain control signal 270.

In the preferred embodiment of the present invention, the gain controller 112 further comprises a limiter 286 for limiting the gain control signal 270 between a maximum value 288 and a minimum value 290 to produce a limited gain control signal 246. In FIG. 2, the value of the gain control signal 246 is equal to the desired net gain of attenuator 204 and VGA 206 for illustration purposes. Generally, the limiter 286 is well known in the art, and hence no additional description need be provided here except as may be necessary to facilitate the understanding of the present invention.

In the preferred embodiment of the present invention, the gain controller 112 the limiter 286 limits the gain control signal 270 to a maximum value 288 responsive to the compensated RSSI 134. Limiting the maximum gain when the received signal is strong minimizes the initial effects of an instantaneous IM burst.

In the preferred embodiment of the present invention, the gain controller further comprises a switch 294. The switch 294 comprises a first summer 293, a second summer 295, a first limiter 296, and a second limiter 297. The VGA control signal 133 is subtracted from the limited control signal 246 to produce a first summer output 298. The first summer output 298 is limited to a max value 291 by the first limiter 296 to produce a attenuator control signal 132. The attenuator control signal 132 is subtracted from the limited control signal 246 to produce a second summer output 299. The second summer output 299 is limited to a min value 292 by the second limiter 297 to produce a attenuator control signal 133. Generally, the first summer 293, second summer 295, first limiter 296, and second limiter 297 are well known in the art, and hence no additional description need be provided here except as may be necessary to facilitate the understanding of the present invention.

The gain of the VGA 206 changes responsive to the gain control signal 133 when the gain control signal 246 is such that the second summer output is greater than a minimum value 292. During this time. the attenuator 204 is clamped to minimum attenuation. When the gain control signal 246 is such that the first summer output 298 is less than a maximum value 291. the attenuation value of the attenuator 204 changes in response to the gain control signal 132. During this time. the gain of the VGA 206 is clamped at the minimum allowed VGA gain. Alternate embodiments might vary either only the attenuator 204 or only the VGA 206.

The integration period of the signal quality determiner 111 that determines Ec/Io will dominate the minimum iteration period for the gain steering loop. The minimum integration time is 64 chips which is approximately 50 microseconds. If automatic gain control (AGC) and active filtering is implemented in the receiver's back end, further timing consideration would be required to ensure that the signal remains in the instantaneous dynamic range of the back end. Either the integration period should be increased, or the number of successive gain steps in the same direction in a given period of time should be limited to allow the back end AGC to settle.

Another advantage of having gain adjustment in the front end of the radio receiver 104 is the extension of the radio receiver's dynamic range. The IF section 216 of the radio receiver 104 is typically the first stage to saturate at strong signals. Therefore, the dynamic range of the radio receiver 104 will be extended by the front end gain reduction.

Figure 3:
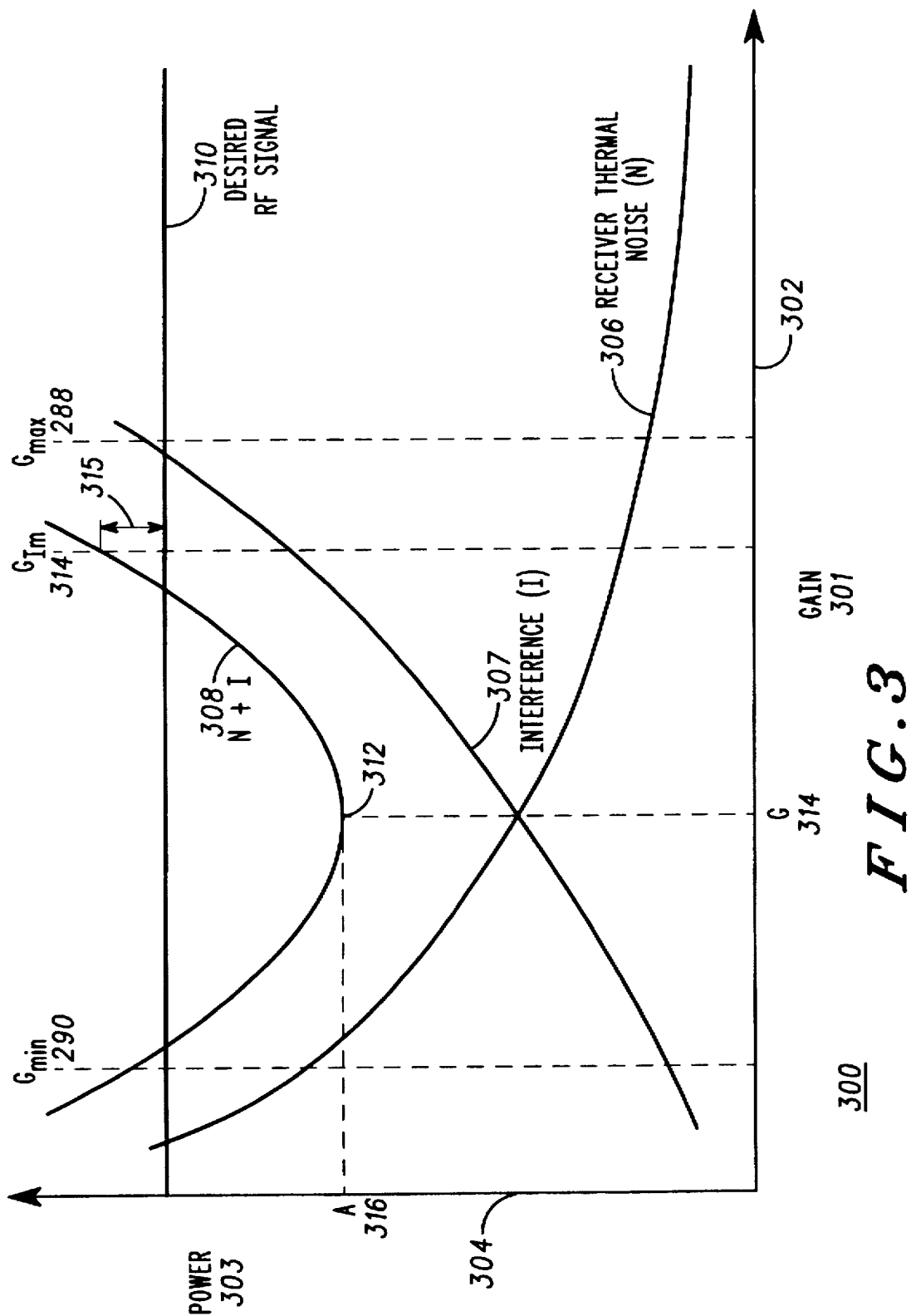
FIG. 3 illustrates a graph plotting desired radio frequency (RF) power, thermal noise power versus gain, interference power versus gain and thermal noise power plus interference power versus gain for the radio receiver of FIG. 1 in accordance with the present invention.

FIG. 3 illustrates a graph 300 plotting receiver thermal noise power referred to the input of the receiver (N) 306, interference power referred to the input of the receiver (I) 307, receiver thermal noise power referred to the input of the receiver plus interference power referred to the input of the receiver (I+N) 308 and the desired RF signal power at the input of the receiver 310 versus the net gain 301 of the attenuator 204 and VGA 206. The receiver thermal power referred to the receiver input decreases with increasing receiver front end gain. The interference power referred to the input of the receiver in FIG. 3 is assumed to be due to IM distortion generated within the receiver due to the undesired RF signals received by the receiver. Therefore, the interference power referred to the input of the receiver 108 increases with increasing receiver front end gain. Thus, the sum of receiver thermal noise power referred to the input of the receiver 108 has a minimum value A 316 at a value of net gain (G) 314. The desired RF signal power is a function of external factors such as distance from the transmitting source and thus is independent of receiver front end gain. The apparatus and method therefore of the present invention steers the front end gain to the gain 314 which maximizes the ratio of the desired RF signal power to the sum of the receiver thermal noise referred to the receiver input plus the interference power referred to the input of the receiver. This maximum ratio corresponds to optimum received signal quality.

In FIG. 3 receiver thermal noise and IM interference are considered to be the dominate sources of signed quality degradation. If additional sources of distortion or noise such as signal distortion due to the saturation characteristics of stages following the front end are inherent in the receiver, the present invention will steer to the value of gain that minimizes the sum of all front end gain dependent distortion products since this maximizes the received signal quality.

Gim 314 provides an initialized starting point for the net gain 301 for the gain control loop. At this point a ratio 315 of Ior/(N+I) is a predetermined minimum value, such as −1.1 dB for example. In the preferred embodiment of the present invention. the gain controller 112 dynamically steers the receiver gain based on the signal to noise ratio (Ec/Io) of the radio receiver 104. In a CDMA radio receiver when multiple rake fingers are in use, the Ec/Io that is the highest of those available from the rake fingers will be used. The basic operation of the gain controller 112 includes two steps. Firstly, if the present value of Ec/Io is better than the previous value of Ec/Io, the gain controller 112 steps the gain in the same direction as the previous gain step. Secondly, if the present value of Ec/Io is worse than the previous value of Ec/Io, the gain controller 112 steps the gain in the opposite direction as the previous gain step. The gain of the VGA 206 changes for each new Ec/Io sample. When the loop settles to the optimum gain setting G 314, the gain toggles above and below the optimum setting.

Figure 4:
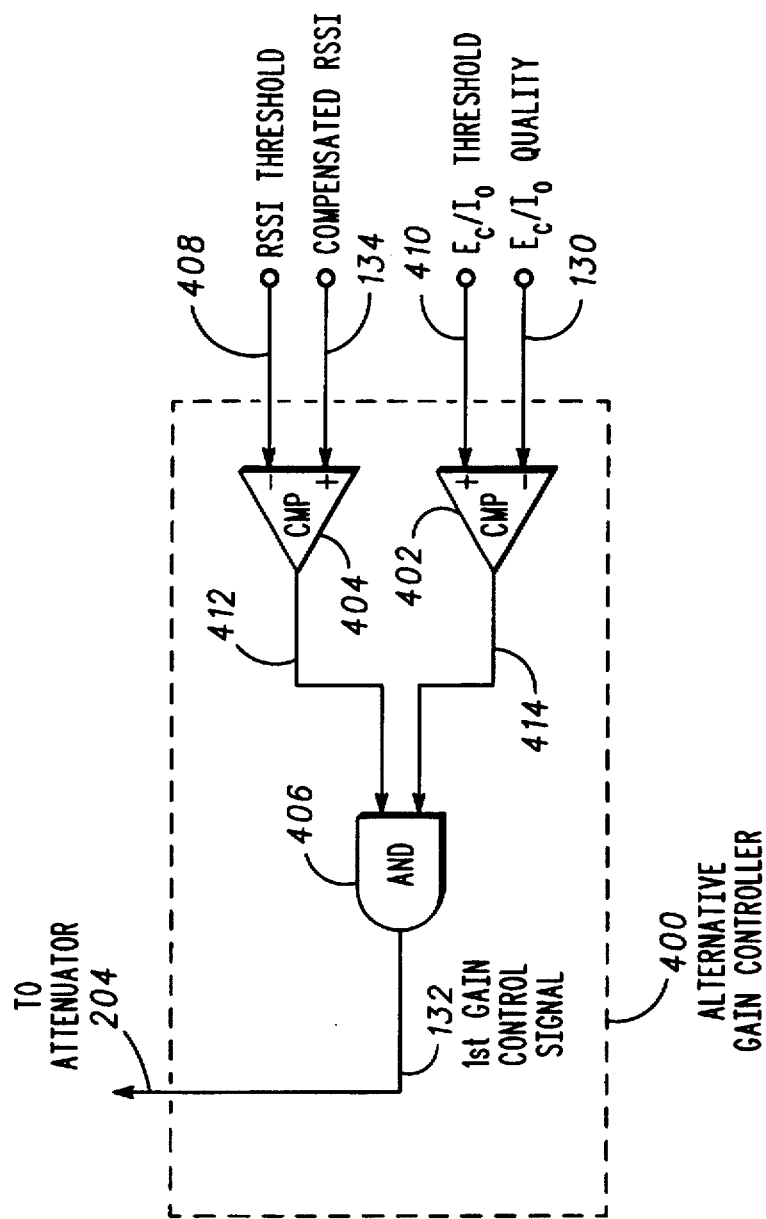
FIG. 4 illustrates an alternative detailed block diagram a gain controller in the radio transceiver of FIG. 1 in accordance with the present invention.

FIG. 4 illustrates an alternative detailed block diagram of the gain controller 112 of FIG. 1 in accordance with the present invention. Generally the alternative gain controller 400 comprises a first comparator 402, a second comparator 404 and an AND gate 406. Generally, the first comparator 402, the second comparator 404 and the AND gate 406 are individually well known in the art, and hence no additional description need be provided here except as may be necessary to facilitate the understanding of the present invention. The first comparator 402 determines whether the quality 130 of the received signal is favorable or unfavorable. In the preferred embodiment of the present invention, the quality is Ec/Io discussed hereinabove. The determination is made by comparing the determined Ec/Io to a predetermined Ec/Io threshold 410 to produce a first output signal 414. The second comparator 404 determines whether the RSSI 134 of the received signal 124 is favorable or unfavorable. In the preferred embodiment of the present invention, the RSSI 134 of the received signal 124 is the compensated RSSI 134 discussed hereinabove. The determination is made by comparing the compensated RSSI 134 to a predetermined RSSI threshold 408 to produce a second output signal 412. The predetermined RSSI threshold 408 is set based on the predetermined attenuator value so that the attenuator 204 is not switched in at a receive signal level that would reduce the ratio of Ior/N to below a predetermined ratio. Ior is the desired RF signal power from the desired base station and N is the receiver thermal noise referred to the input of the receiver. The alternative gain controller 400 adjusts the gain of the radio receiver 104 when both the quality 130 and the RSSI 134 of the received signal 124 are favorable. A favorable determination is made when both the first output signal 414 and the second output signal 412 are at logic high levels at the input to the AND gate 406. This occurs when the combination of a rising RSSI 134 and a decreasing Ec/Io ratio 130 is detected. The alternative gain controller 400 does not adjust the gain of the radio receiver 104 when either the quality 130 or the RSSI 134 of the received signal 124 is unfavorable or both the quality 130 and the RSSI 134 of the received signal 124 are unfavorable. An favorable determination is made when either or both the first output signal 414 and the second output signal 412 are at logic low levels at the input to the AND gate 406.

Thus, the present invention provides an apparatus and method for optimizing the quality of a received signal in a radio receiver. The present invention advantageously reduces intermodulation distortion in a radio receiver. This advantage is substantially provided by a novel gain controller 112 that adjusts the gain of the radio receiver 104 responsive to the quality 130 of the received signal 124. With the present invention the problems of dropping a telephone call when receiving strong undesired RF signal of the prior art are substantially resolved.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. A method for optimizing a quality of a received signal in a radio receiver having gain, the method comprising the steps of:

receiving a radio frequency (RF) signal to produce the received signal;

determining the quality of the received signal;

estimating a received signal strength indication (RSSI of the received signal, determining whether the quality of the received signal is favorable or unfavorable;

determining whether the RSSI of the received signal is favorable or unfavorable; and adjusting the gain of the radio receiver responsive to the quality of the received signal when both the quality of the received signal and the RSSI of the received signal are favorable, and not adjusting the gain of the radio receiver when either the quality or the RSSI of the received signal is unfavorable or both the quality of the received signal and the RSSI of the received signal are unfavorable.

2. A method according to claim 1 wherein the received signal includes a desired signal and an undesired signal, and wherein the quality of the received signal further comprises:

a ratio indicative of the desired signal to the received signal.

3. A method according to claim 2 wherein the ratio further comprises:

an energy per chip of the desired signal (Ec) to a total power spectral density of the received signal (Io).

4. A method according to claim 1 further comprising the step of:

demodulating the received signal to produce a demodulated signal;

wherein the step of determining the quality of the received signal further comprises the step of estimating an error rate of the demodulated signal; and wherein the step of adjusting is performed responsive to the error rate of the demodulated signal.

5. A method according to claim 1 wherein the RF signal includes a desired RF signal and an undesired RF signal, the method further comprising the steps of:

compensating the RSSI of the received signal responsive to the gain of the radio receiver to produce a compensated RSSI of the received signal indicative of the RSSI of the desired RF signal.

6. A method according to claim 1 further comprising the step of:

generating a gain control signal responsive to the quality of the received signal;

wherein the step of adjusting is performed responsive to the gain control signal.

7. A method according to claim 6 wherein the step of generating further comprises the steps of:

comparing a present measurement of the quality of the received signal with a past measurement of the quality of the received signal to produce a first output signal;

comparing a present measurement of the gain with a past measurement of the gain to produce a second output signal; and determining the gain control signal responsive to the first and second output signals.

8. A method according to claim 7 wherein the step of determining further comprises the steps of:

multiplying the first output signal and the second output signal to produce a multiplied signal;

multiplying the multiplied signal by a predetermined gain control step value to produce a gain control step signal; and summing the gain control step signal with a present gain control signal to produce a future gain control signal.

9. A method according to claim 6 further comprising the step of:

limiting the gain control signal between a maximum value and a minimum value.

10. A method according to claim 6 wherein the RF signal includes a desired RF signal and an undesired RF signal, the method further comprising the step of:

limiting the gain control signal to a maximum value responsive to a received signal strength indication (RSSI) of the desired RF signal.

11. A method according to claim 6 further comprising the step of:

determining whether the gain control signal is favorable or unfavorable;

adjusting a first gain stage of the radio receiver when the gain control signal is favorable; and adjusting a second gain stage of the radio receiver when the gain control signal is unfavorable.

12. A method for optimizing a quality of a received signal in a radio receiver having gain, wherein the received signal includes a desired signal and an undesired signal, the method comprising the steps of:

receiving a radio frequency (RF) signal to produce the received signal;

determining the quality of the received signal, wherein the quality of the received signal further comprises a ratio indicative of the desired signal to the received signal;

comparing a present measurement of the quality of the received signal with a past measurement of the quality of the received signal to produce a first output signal;

comparing a present measurement of the gain with a past measurement of the gain to produce a second output signal;

multiplying the first output signal and the second output signal to produce a multiplied signal;

multiplying the multiplied signal by a predetermined gain control step value to produce a gain control step signal;

summing the gain control step signal with a present gain control signal to produce a future gain control signal; and adjusting the gain of the radio receiver responsive to the future gain control signal.

13. A method according to claim 12 wherein the ratio further comprises:

an energy per chip of the desired signal (Ec) to a total power spectral density of the received signal (Io).

14. A method according to claim 12 wherein the RF signal includes a desired RF signal and an undesired RF signal, the method further comprising the steps of:

estimating a received signal strength indication (RSSI) of the received signal; and compensating the RSSI of the received signal responsive to the gain of the radio receiver to produce a compensated RSSI of the received signal indicative of the RSSI of the desired RF signal.

15. A method according to claim 12 further comprising the step of:

limiting the gain control signal between a maximum value and a minimum value.

16. A method according to claim 12 wherein the RF signal includes a desired RF signal and an undesired RF signal, the method further comprising the step of:

limiting the gain control signal to a maximum value responsive to a received signal strength indication (RSSI) of the desired RF signal.

17. A method according to claim 12 further comprising the step of:

determining whether the gain control signal is favorable or unfavorable;

adjusting a first gain stage of the radio receiver when the gain control signal is favorable; and adjusting a second gain stage of the radio receiver when the gain control signal is unfavorable.

18. A method for optimizing a quality of a received signal in a radio receiver having gain, wherein the received signal includes a desired signal and an undesired signal, the method comprising the steps of:

receiving a radio frequency (RF) signal to produce the received signal;

determining the quality of the received signal, wherein the quality of the received signal further comprises a ratio indicative of the desired signal to the received signal, wherein the ratio further comprises an energy per chip of the desired signal (Ec) to a total power spectral density of the received signal (Io);

comparing a present measurement of the quality of the received signal with a past measurement of the quality of the received signal to produce a first output signal;

comparing a present measurement of the gain with a past measurement of the gain to produce a second output signal;

multiplying the first output signal and the second output signal to produce a multiplied signal;

multiplying the multiplied signal by a predetermined gain control step value to produce a gain control step signal;

summing the gain control step signal with a present gain control signal to produce a figure gain control signal; and adjusting the gain of the radio receiver responsive to the future gain control signal.

19. A method according to claim 18 wherein the RF signal includes a desired RF signal and an undesired R signal, the method further comprising the steps of:

estimating a received signal strength indication (RSSI) of the received signal; and compensating the RSSI of the received signal responsive to the gain of the radio receiver to produce a compensated RSSI of the received signal indicative of the RSSI of the desired RF signal.

20. A method according to claim 18 further comprising the step of:

limiting the gain control signal between a maximum value and a minimum value.

21. A method according to claim 18 wherein the RF signal includes a desired RF signal and an undesired RE signal, the method further comprising the step of:

limiting the gain control signal to a maximum value responsive to a received signal strength indication (RSSI) of the desired RF signal.

22. A method according to claim 18 further comprising the step of:

determining whether the gain control signal is favorable or unfavorable;

adjusting a first gain stage of the radio receiver when the gain control signal is favorable; and adjusting a second gain stage of the radio receiver when the gain control signal is unfavorable.

23. An apparatus for optimizing a quality of a received signal in a radio receiver having gain, the apparatus comprising:

a receiver for receiving a radio frequency (RF) signal to produce the received signal;

a signal quality determiner for determining the quality of the received signal;

a received signal strength indication (RSSI) estimator for estimating the RSSI of the received signal;

a first comparator for determining whether the quality of the received signal is favorable or unfavorable;

a second comparator for determining whether the RSSJ of the received signal is favorable or unfavorable; and a gain controller for adjusting the gain of the radio receiver responsive to the quality of the received signal when both the quality of the received signal and the RSSI of the received signal are favorable, and for not adjusting the gain of the radio receiver when either the quality of the received signal or the RSSI of the received signal is unfavorable or both the quality of the received signal and the RSSI of the received signal are unfavorable.

24. An apparatus according to claim 23 wherein the received signal includes a desired signal and an undesired signal, and wherein the quality of the received signal further comprises:

a ratio indicative of the desired signal to the received signal.

25. An apparatus according to claim 24 wherein the ratio further comprises:

an energy per chip of the desired signal (Ec) to a total power spectral density of the received signal (Io).

26. An apparatus according to claim 23 further:

a demodulator for demodulating the received signal to produce a demodulated signal;

wherein the signal quality determiner further comprises an error rate estimator for estimating an error rate of the demodulated signal; and wherein gain controller adjusts the gain of the radio receiver responsive to the error rate of the demodulated signal.

27. An apparatus according to claim 23 wherein the RF signal includes a desired RP signal and an undesired RF signal, the apparatus further comprising:

a RSSI compensator for compensating the RSSI of the received signal responsive to the gain of the radio receiver to produce a compensated RSSI of the received signal indicative of the RSSI of the desired RF signal.

28. An apparatus according to claim 23:

wherein the gain controller generates a gain control signal responsive to the quality of the received signal; and wherein the gain controller adjusts the gain of the radio receiver responsive to the gain control signal.

29. An apparatus according to claim 28 wherein the gain controller further comprises:
 a first comparator for comparing a present measurement of the quality of the received signal with a past measurement of the quality of the received signal to produce a first output signal;
 a second comparator for comparing a present measurement of the gain with a past measurement of the gain to produce a second output signal; and
 a gain control signal determiner for determining the gain control signal responsive to the first and second output signals.

30. An apparatus according to claim 29 wherein the gain control signal determiner further comprises:
 a first multiplier for multiplying the first output signal and the second output signal to produce a multiplied signal;
 a second multiplier for multiplying the multiplied signal by a predetermined gain control step value to produce a gain control step signal; and
 a summer for summing the gain control step signal with a present gain control signal to produce a future gain control signal.

31. An apparatus according to claim 28 wherein the gain controller further comprises:
 a limiter for limiting the gain control signal between a maximum value and a minimum value.

32. An apparatus according to claim 28 wherein the RF signal includes a desired RF signal an undesired RF signal, wherein the gain controller further comprises:
 a limiter for limiting the gain control signal to a maximum value responsive to a received signal strength indication (RSSI) of the desired RF signal.

33. An apparatus according to claim 28 wherein the gain controller further comprises:
 a gain control signal determiner for determining whether the gain control signal is favorable or unfavorable; and
 a switch permitting the gain controller to adjust a first gain stage of the radio receiver when the gain control signal is favorable and to adjust a second gain stage of the radio receiver when the gain control signal is unfavorable.

34. An apparatus for optimizing a quality of a received signal in a radio receiver having gain, wherein the received signal includes a desired signal and an undesired signal, the apparatus comprising:
 a receiver for receiving a radio frequency (RF) signal to produce the received signal;
 a signal quality determiner for determining the quality of the received signal, wherein the quality of the received signal further comprises a ratio indicative of the desired signal to the received signal;
 a gain controller comprising:
  a first comparator for comparing a present measurement of the quality of the received signal with a past measurement of the quality of the received signal to produce a first output signal;
  a second comparator for comparing a present measurement of the gain with a past measurement of the gain to produce a second output signal;
  a first multiplier for multiplying the first output signal and the second output signal to produce a multiplied signal;
  a second multiplier for multiplying the multiplied signal by a predetermined gain control step value to produce a gain control step signal; and
  a summer for summing the gain control step signal with a present gain control signal to produce a future gain control signal;
  wherein the gain controller adjusts the gain of the radio receiver responsive to the future gain control signal.

35. An apparatus according to claim 34 wherein the ratio further comprises:
 an energy per chip of the desired signal (Ec) to a total power spectral density of the received signal (Io).

36. An apparatus according to claim 34 wherein the RF signal includes a desired RF signal an undesired RF signal, the apparatus further comprising:
 a received signal strength indication (RSSI) estimator for estimating the RSSI of the received signal; and
 a RSSI compensator for compensating the RSSI of the received signal responsive to the gain of the radio receiver to produce a compensated RSSI of the received signal indicative of the RSSI of the desired RF signal.

37. An apparatus according to claim 34 further comprising:
 a limiter for limiting the gain control signal between a maximum value and a minimum value.

38. An apparatus according to claim 34 wherein the RF signal includes a desired RF signal and an undesired RE signal, the apparatus further comprising:
 a limiter for limiting the gain control signal to a maximum value responsive to a received signal strength indication (RSSI) of the desired RF signal.

39. An apparatus according to claim 34 further comprising:
 a gain control signal determininer for determining whether the gain control signal is favorable or unfavorable; and
 a switch permitting the gain controller to adjust a first gain stage of the radio receiver when the gain control signal is favorable and to adjust a second gain stage of the radio receiver when the gain control signal is unfavorable.

40. An apparatus for optimizing a quality of a received signal in a radio receiver having gain, wherein the received signal includes a desired signal and an undesired signal, the apparatus comprising:
 a receiver for receiving a radio frequency (RF) signal to produce the received signal;
 a signal quality determiner for determining the quality of the received signal, wherein the quality of the received signal further comprises a ratio indicative of the desired signal to the received signal, wherein the ratio further comprises an energy per chip of the desired signal (Ec) to a total power spectral density of the received signal (Io);
 a gain controller comprising:
  a first comparator for comparing a present measurement of the quality of the received signal with a past measurement of the quality of the received signal to produce a first output signal;
  a second comparator for comparing a present measurement of the gain with a past measurement of the gain to produce a second output signal;
  a first multiplier for multiplying the first output signal and the second output signal to produce a multiplied signal;
  a second multiplier for multiplying die multiplied signal by a predetermined gain control step value to produce a gain control step signal; and a summer for summing the gain control step signal with a present gain control signal to produce a future gain control signal;

wherein the gain controller adjusts the gain of the radio receiver responsive to the future gain control signal.

41. An apparatus according to claim 40 wherein the RF signal includes a desired RF signal an undesired RF signal. the apparatus further comprising:

a received signal strength indication (RSSI) estimator for estimating the RSSI of the received signal; and a RSSI compensator for compensating the RSSI of the received signal responsive to the gain of the radio receiver to produce a compensated RSSI of the received signal indicative of the RSSI of the desired RF signal.

42. An apparatus according to claim 40 further comprising:

a limiter for limiting the gain control signal between a maximum value and a minimum value.

43. An apparatus according to claim 40 wherein the RF signal includes a desired RF signal and an undesired RF signal. the apparatus flirter comprising:

a limiter for limiting the gain control signal to a maximum value responsive to a received signal strength indication (RSSI) of the desired RF signal.

44. An apparatus according to claim 40 further comprising:

a gain control signal determiner for determining whether the gain control signal is favorable or unfavorable; and a switch permitting the gain controller to adjust a first gain stage of the radio receiver when the gain control signal is favorable and to adjust a second gain stage of the radio receiver when the gain control signal is unfavorable.

45. A method for optimizing a quality of a received signal in a radio receiver having gain. the method comprising the steps of receiving a radio frequency (RF) signal to produce the received signal;

determining the quality of the received signal;

comparing a present measurement of the quality of the received signal with a past measurement of the quality of the received signal to produce a first output signal;

comparing a present measurement of the gain with a past measurement of the gain to produce a second output signal; and determining a gain control signal responsive to the first and second output signals; and adjusting the gain of the radio receiver responsive to the gain control signal.

46. A method according to claim 45 wherein the received signal includes a desired signal and an undesired signal, and wherein the quality of the received signal further comprises:

a ratio indicative of the desired signal to the received signal.

47. A method according to claim 46 wherein the ratio further comprises:

an energy per chip of the desired signal (Ec) to a total power spectral density of the received signal (Io).

48. A method according to claim 45 further comprising the step of:

demodulating the received signal to produce a demodulated signal;

wherein the step of determining the quality of the received signal further comprises the step of estimating an error rate of the demodulated signal; and wherein the step of adjusting is performed responsive to the error rate of the demodulated signal.

49. A method according to claim 45 wherein the RF signal includes a desired RF signal and an undesired RF signal. the method further comprising the steps of:

estimating a received signal strength indication (RSSI) of the received signal; and compensating the RSSI of the received signal responsive to the gain of the radio receiver to produce a compensated RSSI of the received signal indicative of the RSSI of the desired RF signal.

50. A method according to claim 45 the method further comprising the step of estimating a received signal strength indication (RSSI) of the received signal;

determining whether the quality of the received signal is favorable or unfavorable; and determining whether the RSSI of the received signal is favorable or unfavorable;

wherein the step of adjusting is performed when both the quality and the RSSI of the received signal are favorable; and wherein the step of adjusting is not performed when either the quality or the RSSI of the received signal is unfavorable or both the quality and the RSSI of the received signal are unfavorable.

51. A method according to claim 50 wherein the RF signal includes a desired RE signal and an undesired RF signal. the method further comprising the step of:

compensating the RSSI of the received signal responsive to the gain of the radio receiver to produce a compensated RSSI of the received signal indicative of the RSSI of the desired RF signal.

52. A method according to claim 45 wherein the step of determining further comprises the steps of:

multiplying the first output signal and the second output signal to produce a multiplied signal;

multiplying the multiplied signal by a predetermined gain control step value to produce a gain control step signal; and summing the gain control step signal with a present gain control signal to produce a future gain control signal.

53. A method according to claim 45 further comprising the step of:

limiting the gain control signal between a maximum value and a minimum value.

54. A method according to claim 45 wherein the RF signal includes a desired RF signal and an undesired RF signal the method further comprising the step of:

limiting the gain control signal to a maximum value responsive to a received signal strength indication (RSSI) of the desired RF signal.

55. A method according to claim 45 further comprising the step of determining whether the gain control signal is favorable or unfavorable;

adjusting a first gain stage of the radio receiver when the gain control signal is favorable; and adjusting a second gain stage of the radio receiver when the gain control signal is unfavorable.

56. An apparatus for operating a quality of a received signal in a radio receiver having gain. the apparatus comprising:

a receiver for receiving a radio frequency (RF) signal to produce the received signal;

a signal quality determiner for determining the quality of the received signal;

a first comparator for comparing a present measurement of the quality of the received signal with a past measurement of the quality of the received signal to produce a first output signal;

a second comparator for comparing a present measurement of the gain with a past measurement of the gain to produce a second output signal; and a gain control signal determiner for determining a gain control signal responsive to the first and second output signals; and a gain controller for adjusting the gain of the radio receiver responsive to the gain control signal.

57. An apparatus according to claim 56 wherein the received signal includes a desired signal and an undesired signal, and wherein the quality of the received signal further comprises:

a ratio indicative of the desired signal to the received signal.

58. An apparatus according to claim 57 wherein the ratio further comprises:

an energy per chip of the desired signal (Ec) to a total power spectral density of the received signal (Io).

59. An apparatus according to claim 56 further:

a demodulator for demodulating the received signal to produce a demodulated signal;

wherein the signal quality determiner further comprises an error rate estimator for estimating an error rate of the demodulated signal; and wherein gain controller adjusts the gain of the radio receiver responsive to the error rate of the demodulated signal.

60. An apparatus according to claim 56 wherein the RF signal includes a desired RF signal and an undesired RF signal, the apparatus further comprising:

a received signal strength indication (RSSI) estimator for estimating the RSSI of the received signal; and a RSSI compensator for compensating the RSSI of the received signal responsive to the gain of the radio receiver to produce a compensated RSSI of the received signal indicative of the RSSI of the desired RE signal.

61. An apparatus according to claim 56 the apparatus further comprising:

a received signal strength indication (RSSI) estimator for estimating the RSSI of the received signal;

a first comparator for determining whether the quality of the received signal is favorable or unfavorable; and a second comparator for determining whether the RSSI of he received signal is favorable or unfavorable;

wherein the gain controller adjusts the gain of the radio receiver when both the quality and the RSSI of the received signal are favorable; and wherein the gain controller does not adjust the gain of the radio receiver when either the quality or the RSSI of the received signal is unfavorable or both the quality and the RSSI of the received signal are unfavorable.

62. An apparatus according to claim 61 wherein the RF signal includes a desired RF signal and an undesired RF signal, the apparatus further comprising:

a RSSI compensator for compensating the RSSI of the received signal responsive to the gain of the radio receiver to produce a compensated RSSI of the received signal indicative of the RSSI of the desired RF signal.

63. An apparatus according to claim 56 wherein the gain control signal determiner further comprises:

a first multiplier for multiplying the first output signal and the second output signal to produce a multiplied signal;

a second multiplier for multiplying the multiplied signal by a predetermined gain control step value to produce a gain control step signal; and a summer for summing the gain control step signal with a present gain control signal to produce a future gain control signal.

64. An apparatus according to claim 56 wherein the gain controller further comprises:

a limiter for limiting the gain control signal between a maximum value and a minimum value.

65. An apparatus according to claim 56 wherein the RF signal includes a desired RF signal and an undesired RF signal, wherein the gain controller further comprises:

a limiter for limiting the gain control signal to a maximum value responsive to a received signal strength indication (kSSI) of the desired RF signal.

66. An apparatus according to claim 56 wherein the gain controller further comprises:

a gain control signal determiner for determining whether the gain control signal is favorable or unfavorable; and a switch permitting the gain controller to adjust a first gain stage of the radio receiver when the gain control signal is favorable and to adjust a second gain stage of the radio receiver when the gain control signal is unfavorable.

67. A method for optimizing a quality of a received signal in a radio receiver having gain, the method comprising the steps of:

receiving a radio frequency (RF) signal to produce the received signal;

determining the quality of the received signal;

determining a signal power level of the received signal;

determining a signal power of interfering signals received by the radio receiver which cause intermodulation distortion to be generated within the radio receiver, wherein a signal power level of the interfering signals increases as the gain of the radio receiver increases;

determining a signal power level of thermal noise in the radio receiver, wherein the signal power level of the thermal noise decreases as the gain of the radio receiver decreases; and continuously steering the gain of the radio receiver responsive to the quality of the received signal to maximize a ratio of the signal power of the received signal to a summation of the signal power level of the interfering signals and the signal power level of the thermal noise thereby optimizing the quality of the received signal.

68. A method according to claim 67 wherein the received signal includes a desired signal and an undesired signal, and wherein the quality of the received signal further comprises:

a ratio indicative of the desired signal to the received signal.

69. A method according to claim 68 wherein the ratio further comprises:

an energy per chip of the desired signal (Ec) to a total power spectral density of the received signal (Io).

21

70. A method according to claim 67 further comprising the step of demodulating the received signal to produce a demodulated signal;

wherein the step of determining the quality of the received signal filter comprises the step of estimating an error rate of the demodulated signal; and wherein the step of adjusting is performed responsive to the error rate of the demodulated signal.

71. A method according to claim 67 wherein the RF signal includes a desired RF signal and an undesired RF signal, the method further comprising the steps of;

estimating a received signal strength indication (RSSI) of the received signal; and compensating the RSSI of the received signal responsive to the gain of the radio receiver to produce a compensated RSSI of the received signal indicative of the RSSI of the desired RF signal.

72. A method according to claim 67 the method further comprising the step of:

estimating a received signal strength indication (RSSI) of the received signal;

determining whether the quality of the received signal is favorable or unfavorable; and determining whether the RSSI of the received signal is favorable or unfavorable;

wherein the step of adjusting is performed when both the quality and the RSSI of the received signal are favorable; and wherein the step of adjusting is not performed when either the quality or the RSSI of the received signal is unfavorable or both the quality and the RSSI of the received signal are unfavorable.

73. A method according to claim 72 wherein the RF signal includes a desired RF signal and an undesired RF signal, the method further comprising the step of:

compensating the RSSI of the received signal responsive to the gain of the radio receiver to produce a compensated RSSI of the received signal indicative of the RSSI of the desired RF signal.

74. A method according to claim 67 further comprising the step of:

generating a gain control signal responsive to the quality of the received signal;

wherein the step of adjusting is performed responsive to the gain control signal.

75. A method according to claim 74 wherein the step of generating further comprises the steps of:

comparing a present measurement of the quality of the received signal with a past measurement of the quality of the received signal to produce a first output signal;

comparing a present measurement of the gain with a past measurement of the gain to produce a second output signal; and determining the gain control signal responsive to the fist and second output signals.

76. A method according to claim 75 wherein the step of determining further comprises the steps of, multiplying the first output signal and the second output signal to produce a multiplied signal;

multiplying the multiplied signal by a predetermined gain control step value to produce a gain control step signal; and summing the gain control step signal with a present gain control signal to produce a future gain control signal.

22

77. A method according to claim 74 further comprising the step of:

limiting the gain control signal between a maximum value and a minimum value.

78. A method according to claim 74 wherein the RF signal includes a desired RF signal and an undesired RF signal, the method further comprising the step of:

limiting the gain control signal to a maximum value responsive to a received signal strength indication (RSSI) of the desired RE signal.

79. A method according to claim 74 further comprising the step of:

determining whether the gain control signal is favorable or unfavorable;

adjusting a first gain stage of the radio receiver when the gain control signal is favorable; and adjusting a second gain stage of the radio receiver when the gain control signal is unfavorable.

80. An apparatus for optimizing a quality of a received signal in a radio receiver having gain, the apparatus comprising:

a receiver for receiving a radio frequency (RF) signal to produce the received signal;

a signal quality determiner for determining the quality of the received signal; and a gain controller for continuously steering the gain of the radio receiver responsive to the quality of the received signal to maximize a ratio of a signal power of the received signal to a summation of a signal power level of interfering signals received by the radio receiver and a signal power level of thermal noise in the radio receiver thereby optimizing the quality of the received signal, wherein the interfering signals received by the radio receiver cause intermodulation distortion to be generated within the radio receiver, wherein the signal power level of the interfering signals increases as the gain of the radio receiver increases and wherein the signal power level of the thermal noise decreases as the gain of the radio receiver decreases.

81. An apparatus according to claim 80 wherein the received signal includes a desired signal and an undesired signal, and wherein the quality of the received signal further comprises:

a ratio indicative of the desired signal to the received signal.

82. An apparatus according to claim 81 wherein the ratio further comprises:

an energy per chip of the desired signal (Ec) to a total power spectral density of the received signal (Io).

83. An apparatus according to claim 80 further:

a demodulator for demodulating the received signal to produce a demodulated signal;

wherein the signal quality determiner further comprises an error rate estimator for estimating an error rate of the demodulated signal; and wherein gain controller adjusts the gain of the radio receiver responsive to the error rate of the demodulated signal.

84. An apparatus according to claim 80 wherein the R signal includes a desired RF signal and an undesired RF signal, the apparatus further comprising:

a received signal strength indication (RSSI) estimator for estimating the RSSI of the received signal; and a RSSI compensator for compensating the RSSI of the received signal responsive to the gain of the radio receiver to produce a compensated RSSI of the received signal indicative of the RSSI of the desired RF signal.

85. An apparatus according to claim 80 the apparatus further comprising:
 a received signal strength indication (RSSI) estimator for estimating the RSSI of the received signal;
 a first comparator for determining whether the quality of the received signal is favorable or unfavorable; and
 a second comparator for determining whether the RSSI of the received signal is favorable or unfavorable;
 wherein the gain controller adjusts the gain of the radio receiver when both the quality and the RSSI of the received signal are favorable; and
 wherein the gain controller does not adjust the gain of the radio receiver when either the quality or the RSSI of the received signal is unfavorable or both the quality and the RSSI of the received signal are unfavorable.

86. An apparatus according to claim 85 wherein the RF signal includes a desired RF signal and an undesired RF signal, the apparatus further comprising:
 a RSSI compensator for compensating the RSSI of the received signal responsive to the gain of the radio receiver to produce a compensated RSSI of the received signal indicative of the RSSI of the desired RE signal.

87. An apparatus according to claim 80:
 wherein the gain controller generates a gain control signal responsive to the quality of the received signal; and
 wherein the gain controller adjusts the gain of the radio receiver responsive to the gain control signal.

88. An apparatus according to claim 87 wherein the gain controller further comprises:
 a first comparator for comparing a present measurement of the quality of the received signal with a past measurement of the quality of the received signal to produce a first output signal;
 a second comparator for comparing a present measurement of the gain with a past measurement of the gain to produce a second output signal; and
 a gain control signal determiner for determining the gain control signal responsive to the first and second output signals.

89. An apparatus according to claim 88 wherein the gain control signal determiner further comprises:
 a first multiplier for multiplying the first output signal and the second output signal to produce a multiplied signal;
 a second multiplier for multiplying the multiplied signal by a predetermined gain control step value to produce a gain control step signal; and
 a summer for summing the gain control step signal with a present gain control signal to produce a future gain control signal.

90. An apparatus according to claim 87 wherein the gain controller further comprises:
 a limiter for limiting the gain control signal between a maximum value and a minimum value.

91. An apparatus according to claim 87 wherein the RF signal includes a desired RF signal and an undesired RF signal, wherein the gain controller further comprises:
 a limiter for limiting the gain control signal to a maximum value responsive to a received signal strength indication (RSSI) of the desired RP signal.

92. An apparatus according to claim 87 wherein the gain controller further comprises:

a gain control signal determiner for determining whether the gain control signal is favorable or unfavorable; and
 a switch permitting the gain controller to adjust a first gain stage of the radio receiver when the gain control signal is favorable and to adjust a second gain stage of the radio receiver when the gain control signal is unfavorable.

93. A method for optimizing a quality of a received signal in a direct sequence—code division multiple access (DS-CDMA) radio receiver having gain, the method comprising the steps of:
 receiving a radio frequency (RF) signal to produce the received signal, wherein the received signal includes a desired signal and an undesired signal;
 determining the quality of the received signal, wherein the quality of the received signal further comprises a ratio indicative of the desired signal to the received signal, wherein the ratio further comprises an energy per chip of the desired signal (Ec) to a total power spectral density of the received signal (Io), wherein the ratio provides an indication of whether interfering signals are received by the DS-CDMA radio receiver which cause intermodulation distortion to be generated within the radio receiver; and
 decreasing the gain of the radio receiver when interfering signals are determined to be received to increase the linearity of the DS-CDMA radio receiver which reduces the intermodulation distortion thereby improving the quality of the received signal; and
 increasing the gain of the radio receiver when interfering signals are determined not to be received to decrease the linearity of the DS-CDMA radio receiver thereby improving the quality of the received signal.

94. A method according to claim 93 wherein the step of adjusting farther comprises the step of continuously steering the gain of the radio receiver responsive to the quality of the received signal.

95. A method according to claim 93 further comprising the step of:
 demodulating the received signal to produce a demodulated signal;
 wherein the step of determining the quality of the received signal further comprises the step of estimating an error rate of the demodulated signal; and
 wherein the step of adjusting is performed responsive to the error rate of the demodulated signal.

96. A method according to claim 93 wherein the RF signal includes a desired RF signal and an undesired RF signal, the method filter comprising the steps of:
 estimating a received signal strength indication (RSSI) of the received signal; and
 compensating the RSSI of the received signal responsive to the gain of the radio receiver to produce a compensated RSSI of the received signal indicative of the RSSI of the desired RF signal.

97. A method according to claim 93 the method further comprising the step of:
 estimating a received signal strength indication (RSSI) of the received signal;
 determining whether the quality of the received signal is favorable or unfavorable; and
 determine whether the RSSI of the received signal is favorable or unfavorable;
 wherein the step of adjusting is performed when both the quality and the RSSI of the received signal are favorable; and wherein the step of adjusting is not performed when either the quality or the RSSI of the received signal is unfavorable or both the quality and the RSSI of the received signal are unfavorable.

98. A method according to claim 97 further comprising the step of:

compensating the RSSI of the received signal responsive to the gain of the radio receiver to produce a compensated RSSI of the received signal indicative of the RSSI of the desired RF signal.

99. A method according to claim 93 further comprising the step of:

generating a gain control signal responsive to the quality of the received signal;

wherein the step of adjusting is performed responsive to the gain control signal.

100. A method according to claim 99 wherein the step of generating further comprises the steps of:

comparing a present measurement of the quality of the received signal with a past measurement of the quality of the received signal to produce a first output signal;

comparing a present measurement of the gain with a past measurement of the gain to produce a second output signal; and determining the gain control signal responsive to the first and second output signals.

101. A method according to claim 100 wherein the step of determining further comprises the steps of:

multiplying the first output signal and the second output signal to produce a multiplied signal;

multiplying the multiplied signal by a predetermined gain control step value to produce a gain control step signal; and summing the gain control step signal with a present gain control signal to produce a further gain control signal.

102. A method according to claim 99 fibber comprising the step of:

limiting the gain control signal between a maximum value and a minimum value.

103. A method according to claim 99 wherein the RF signal includes a desired RF signal and an undesired RF signal, the method further comprising the step of:

limiting the gain control signal to a maximum value responsive to a received signal strength indication (RSSI) of the desired RF signal.

104. A method according to claim 99 further comprising the step of:

determining whether the gain control signal is favorable or unfavorable;

adjusting a first gain stage of the radio receiver when the gain control signal is favorable; and adjusting a second gain stage of the radio receiver when the gain control signal is unfavorable.

105. An apparatus for optimizing a quality of a received signal in a direct sequence—code division multiple access (DS-CDMA) radio receiver having gain, the apparatus comprising:

a receiver for receiving a radio frequency (RF) signal to produce the received signal, wherein the received signal includes a desired signal and an undesired signal;

a signal quality determiner for determining the quality of the received signal, wherein the quality of the received signal further comprises a ratio indicative of the desired signal to the received signal, wherein the ratio further comprises an energy per chip of the desired signal (Ec) to a total power spectral density of the received signal (Io), wherein the ratio provides and indication of whether interfering signals are received by the DS-CDMA radio receiver which cause intermodulation distortion to be generated within the radio receiver; and a gain controller for improving the quality of the received signal by decreasing the gain of the radio receiver when interfering signals are determined to be received to increase the linearity of the DS-CDMA radio receiver which reduces the intermodulation distortion and by increasing the gain of the radio receiver when interfering signals are determined not to be received to decrease the linearity of the DS-CDMA radio receiver.

106. An apparatus according to claim 105 wherein the gain controller adjusts the gain of the radio receiver by continuously steering the gain of the radio receiver responsive to the quality of the received signal.

107. An apparatus according to claim 105 further comprising:

a demodulator for demodulating the received signal to produce a demodulated signal;

wherein the signal quality determiner further comprises an error rate estimator for estimating an error rate of the demodulated signal; and wherein gain controller adjusts the gain of the radio receiver responsive to the error rate of the demodulated signal.

108. An apparatus according to claim 105 wherein the RF signal includes a desired RF signal and an undesired RF signal, the apparatus further comprising:

a received signal strength indication (RSSI) estimator for estimating the RSSI of the received signal; and a RSSI compensator for compensating the RSSI of the received signal responsive to the gain of the radio receiver to produce a compensated RSSI of the received signal indicative of the RSSI of the desired RF signal.

109. An apparatus according to claim 105 the apparatus further comprising:

a received signal strength indication (RSSI) estimator for estimating the RSSI of the received signal;

a first comparator for determining whether the quality of the received signal is favorable or unfavorable, and a second comparator for determining whether the PSSI of the received signal is favorable or unfavorable;

wherein the gain controller adjusts the gain of the radio receiver when both the qualify and the RSSI of the received signal are favorable; and wherein the gain controller does not adjust the gain of the radio receiver when either the quality or the RSSI of the received signal is unfavorable or both the quality and the RSSI of the received signal are unfavorable.

110. An apparatus according to claim 109 further comprising:

a RSSI compensator for compensating the RSSI of the received signal responsive to the gain of the radio receiver to produce a compensated RSSI of the received signal indicative of the RSSI of the desired RF signal.

111. An apparatus according to claim 105:

wherein the gain controller generates a gain control signal responsive to the quality of the received signal; and wherein the gain controller adjusts the gain of the radio receiver responsive to the gain control signal.

112. An apparatus according to claim 111 wherein the gain controller further comprises:

a first comparator for comparing a present measurement of the quality of the received signal with a past measurement of the quality of the received signal to produce a first output signal;

a second comparator for comparing a present measurement of the gain with a past measurement of the gain to produce a second output signal; and a gain control signal determiner for determining the gain control signal responsive to the first and second output signals.

113. An apparatus according to claim 112 wherein the gain control signal determiner further comprises:

a first multiplier for multiplying the first output signal and the second output signal to produce a multiplied signal;

a second multiplier for multiplying the multiplied signal by a predetermined gain control step value to produce a gain control step signal; and a summer for summing the gain control step signal with a present gain control signal to produce a future gain control signal.

114. An apparatus according to claim 112 wherein the gain controller further comprises:

a limiter for limiting the gain control signal between a maximum value and a minimum value.

115. An apparatus according to claim 112 wherein the RF signal includes a desired RF signal and an undesired RE signal, wherein the gain controller further comprises:

a limiter for limiting the gain control signal to a maximum value responsive to a received signal strength indication (RSSI) of the desired RE signal.

116. An apparatus according to claim 111 wherein the gain controller further comprises:

a gain control signal determiner for determining whether the gain control signal is favorable or unfavorable; and a switch permitting the gain controller to adjust a first gain stage of the radio receiver when the gain control signal is favorable and to adjust a second gain stage of the radio receiver when the gain control signal is unfavorable.

* * * * *

UNITED STATES PATENT AND TRADEMARK OFFICE
CERTIFICATE OF CORRECTION

PATENT NO. : 5,758,271
DATED : May 26, 1998
INVENTOR(S) : Rich

It is certified that error appears in the above-indentified patent and that said Letters Patent is hereby corrected as shown below:

Claim 1
    In column 11, line 15, please replace "(RSSI" with --(RSSI)--.
Claim 1
    In column 11, line 16, please start a new paragraph before "determining".
Claim 5
    In column 11, line 48, please replace "steps" with --step--.
Claim 11
    In column 12, line 24, please replace "step" with --steps--.
Claim 17
    In column 13, line 14, please replace "step" with --steps--.
Claim 18
    In column 13, line 46, please replace "figure" with --future--.
Claim 19
    In column 13, line 51, please replace "R signal" with --RF signal--.
Claim 21
    In column 13, line 65, please replace "RE signal" with --RF signal--.
Claim 22
    In column 14, line 5, please replace "step" with --"steps"--.
Claim 26
    In column 14, line 44, please replace " further:" with --further comprising:--.

UNITED STATES PATENT AND TRADEMARK OFFICE
CERTIFICATE OF CORRECTION

PATENT NO. : 5,758,271
DATED : May 26, 1998
INVENTOR(S) : Rich

It is certified that error appears in the above-indentified patent and that said Letters Patent is hereby corrected as shown below:

Claim 27
In column 14, line 54, please replace "RP signal" with -RF signal--.
Claim 32
In column 15, line 29, please add --and-- between "signal" and "an".
Claim 38
In column 16, line 25, please replace "RE" with --RF--.
Claim 40
In column 16, line 65, please replace "die" with --the--.
Claim 41
In column 17, line 7, please add --and-- between "signal" and "an".
Claim 43
In column 17, line 22, please replace "flirter" with --further--.
Claim 45
In column 17, line 37, please replace "of" with --of:--.
Claim 50
In column 18, line 13, please replace "step of" with --step of:--.
Claim 51
In column 18, line 29, please replace "RE" with --RF--.

UNITED STATES PATENT AND TRADEMARK OFFICE
CERTIFICATE OF CORRECTION

PATENT NO. : 5,758,271

DATED : May 26, 1998

INVENTOR(S) : Rich

It is certified that error appears in the above-indentified patent and that said Letters Patent is hereby corrected as shown below:

Claim 55
  In column 18, line 56, please replace "step of" with --step of:-- and begin a new paragraph before the word "determining".

Claim 56
  In column 18, line 63, please replace "operating" with --optimizing--.

Claim 59
  In column 19, line 26, please replace "further:" with --further comprising:--.

Claim 60
  In column 19, line 44, please replace "RE" with --RF--.

Claim 61
  In column 19, line 46, please replace "56" with --56,--.

Claim 61
  In column 19, line 54, please replace "he" with --the--.

Claim 65
  In column 20, line 24, please replace "kSSI" with --RSSI--.

Claim 67
  In column 20, line 50, please replace "decreases" with --increases--.

Claim 70
  In column 21, line 2, please replace "step of" with --step of:-- and start a new paragraph before the word "determining".

UNITED STATES PATENT AND TRADEMARK OFFICE
CERTIFICATE OF CORRECTION

PATENT NO. : 5,758,271
DATED : May 26, 1998
INVENTOR(S) : Rich

It is certified that error appears in the above-indentified patent and that said Letters Patent is hereby corrected as shown below:

Claim 70
    In column 21, line 5, please replace "filter" with --further--.
Claim 72
    In column 21, line 20, please replace "step" with --steps--.
Claim 76
    In column 21, line 60, please replace "of," with --of:--.
Claim 78
    In column 22, line 10, please replace "RE" with --RF--.
Claim 79
    In column 22, line 12, please replace "step" with --steps--.
Claim 80
    In column 22, line 40, please replace "decreases" with --increases--.
Claim 83
    In column 22, line 51, please replace "further:" with --further comprising:--.
Claim 84
    In column 22, line 61, please replace "the R" with --the RF--.
Claim 85
    In column 23, line 4, please replace, "80" with --80,--.
Claim 86
    In column 23, line 26 please replace, "RE" with --RF--.

UNITED STATES PATENT AND TRADEMARK OFFICE
CERTIFICATE OF CORRECTION

PATENT NO. : 5,758,271
DATED : May 26, 1998
INVENTOR(S) : Rich

It is certified that error appears in the above-indentified patent and that said Letters Patent is hereby corrected as shown below:

Claim 91
    In column 23, line 65, please replace "RP" with --RF--.

Claim 94
    In column 24, line 35, please replace "farther" with --further--.

Claim 96
    In column 24, line 49, please replace "filter" with --further--.

Claim 97
    In column 24, line 57, please replace "step" with --steps--.

Claim 101
    In column 25, line 37, please replace "further" with --future--.

Claim 102
    In column 25, line 38, please replace "fibber" with --further--.

Claim 104
    In column 25, line 49, please replace "step" with --steps--.

Claim 109
    In column 26, line 45, please add a new paragraph between "and" and "a".

Claim 109
    In column 26, line 46, please replace "PSSI" with --RSSI--.

UNITED STATES PATENT AND TRADEMARK OFFICE
CERTIFICATE OF CORRECTION

PATENT NO. : 5,758,271
DATED : May 26, 1998
INVENTOR(S) : Rich

It is certified that error appears in the above-indentified patent and that said Letters Patent is hereby corrected as shown below:

<u>Claim 114</u>
   In column 28, line 1, please replace "112" with --111--.
<u>Claim 115</u>
   In column 28, line 5, please replace "112" with --111--.
<u>Claim 115</u>
   In column 28, line 6, please replace "RE" with --RF--.
<u>Claim 115</u>
   In column 28, line 10, please replace "RE" with --RF--.

Signed and Sealed this

Twenty-seventh Day of April, 1999

Attest:

Attesting Officer

Q. TODD DICKINSON

Acting Commissioner of Patents and Trademarks